United States Patent [19]

Maginness

[11] 4,050,005
[45] Sept. 20, 1977

[54] DUAL PHASE INPUT MULTIPLIER

[75] Inventor: Brian K. Maginness, Plano, Tex.

[73] Assignee: Biometrics Instrument Corporation, Garland, Tex.

[21] Appl. No.: 690,537

[22] Filed: May 27, 1976

[51] Int. Cl.² .............................................. H02M 7/00
[52] U.S. Cl. ...................................................... 363/59
[58] Field of Search .......................... 307/110; 321/15; 250/213 VT

[56] References Cited

U.S. PATENT DOCUMENTS

| | | | |
|---|---|---|---|
| 2,619,602 | 11/1952 | Walker et al. | 307/110 |
| 3,432,738 | 3/1969 | Jensen | 321/15 |
| 3,484,866 | 12/1969 | Nakamura et al. | 321/15 |
| 3,723,850 | 3/1973 | Daniels et al. | 321/15 X |
| 3,739,178 | 6/1973 | Chow | 250/213 VT |

Primary Examiner—William M. Shoop
Attorney, Agent, or Firm—Richards, Harris & Medlock

[57] ABSTRACT

The specification discloses a voltage multiplier comprising a plurality of multiplier stages. Each stage includes a first AC line, a second AC line and a diode line which is interposed between the first and second AC lines. Each multiplier stage includes a plurality of capacitors interconnected to the AC lines and the diode line. The input to the multiplier stages comprises first and second transformers. The primary windings of the two transformers are connected in parallel to receive an AC input signal. The secondary windings of the transformers are connected at a grounded center tap, which is also connected to the diode line. The first transformer drives the first AC line and the second transformer drives the second AC line. The AC input signal is multiplied by each stage, and the multiplied voltages are tapped through a rectifier connected to the diode line to provide a DC output voltage.

33 Claims, 4 Drawing Figures

U.S. Patent  Sept. 20, 1977  4,050,005
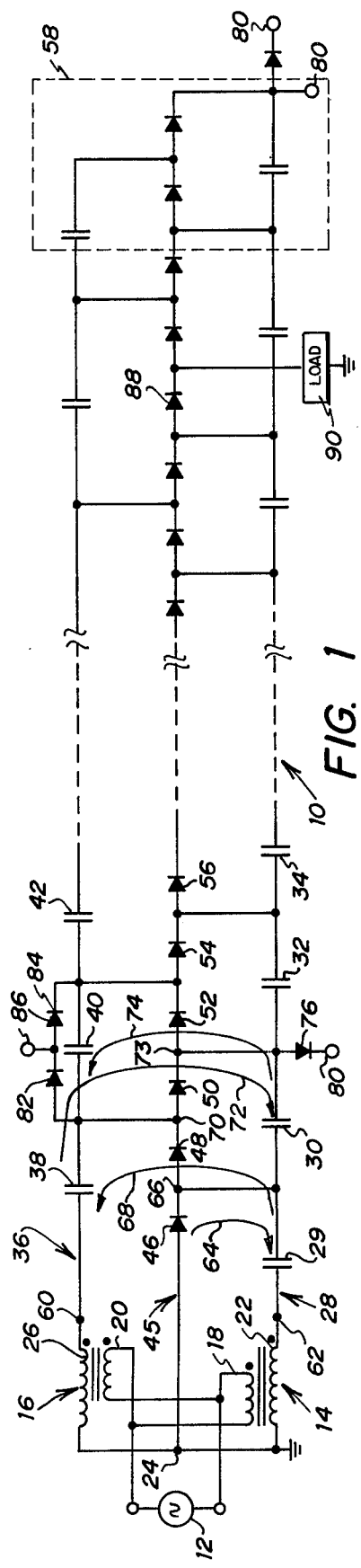
FIG. 1
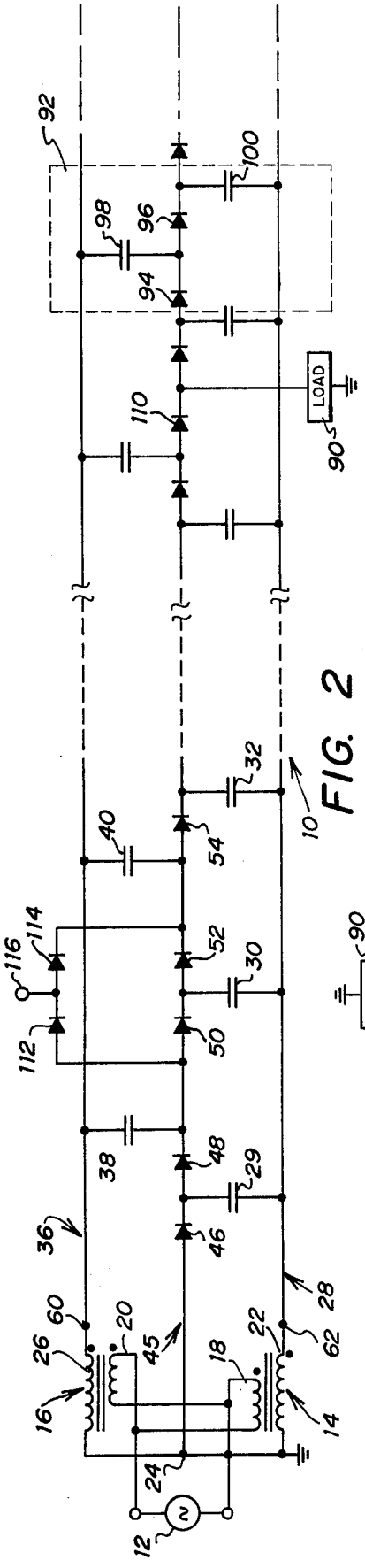
FIG. 2
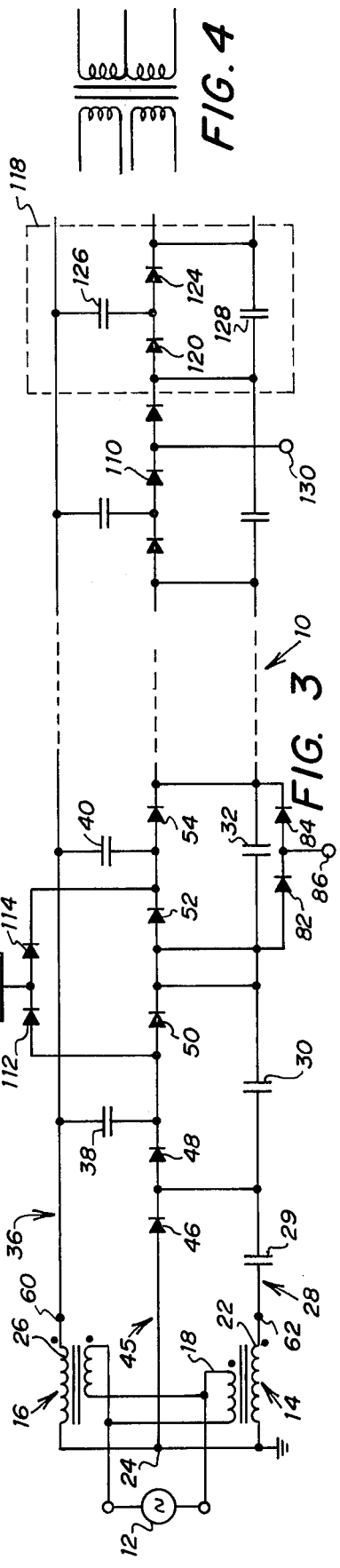
FIG. 3
FIG. 4

DUAL PHASE INPUT MULTIPLIER

FIELD OF THE INVENTION

This invention relates to voltage multipliers, and more particularly relates to a voltage multiplier having a dual transformer input and which is not loaded down by a capacitive load.

THE PRIOR ART

Voltage multipliers which convert a low AC voltage to a high DC voltage are currently used in a variety of applications. Such voltage multipliers find particular usefulness in circuits used to supply the necessary DC voltages to image intensifier tubes which require a plurality of DC bias voltages for their cathodes, microchannel plates, screens, correctors, anodes and focus grids. Because such image intensifier tubes require a plurality of multiplied voltages of different magnitudes, it is desirable that a voltage multiplier have the capability to tap off at several points along the multiplier circuit to supply these varied voltages.

In the past, generally a single transformer has been used to supply the input to a multiplier circuit. In such cases, the interface voltage between the transformer and multiplier was chosen as a compromise between minimizing transformer losses and the number of multiplier stages which could be powered. The use of a single transformer to drive a plurality of stages is described in U.S. Pat. No. 3,739,178, issued on June 12, 1973.

Due to size constraints in an image intensifier device, the input to a multiplier transformer is often limited to a small battery source having a voltage of 2–6 volts. Since the input voltage to such a transformer is low, the transformer must have a high step up ratio and be efficient. Using a single transformer to generate a high output multiplier voltage requires a transformer with many turns in its secondary. These turns produce a high capacitance in the transformer secondary and a high circulating current, which results in high transformer losses.

A further disadvantage associated with prior art multipliers is that the number of voltage points at which multiplied voltages can be tapped is limited where the load is capacitive. The AC points of such prior multipliers cannot be used as taps with a capacitive load, because this type of load will load down the multiplier. One half of the available voltage taps have thus heretofore been unsatisfactory for supplying multiplied voltages where the load is capacitive.

Certain previously developed voltage multipliers have included both AC and DC capacitor strings to produce the required different valued multiplied voltages for an image intensifier tube. The use of two AC capacitor columns and two DC capacitor columns in a voltage multiplier is described in U.S. Pat. No. 3,484,866. However, such devices have required substantial additional space.

SUMMARY OF THE INVENTION

The present invention is directed to a voltage multiplier which substantially eliminates or reduces the disadvantages associated with the prior art. The present transformer-multiplier may be very compactly constructed, operates with low power loss, and may be used to provide a wide choice of voltage taps to drive an image intensifier tube without being loaded down.

In accordance with the present invention, a voltage multiplier includes a plurality of series connected multiplier stages. Each stage includes a first AC line, including a first capacitor, and a second AC line including a second capacitor. A diode line is interposed between the first and the second AC line and includes first and second series connected diodes with the cathode of the first diode being connected to the anode of the second diode. The first capacitor is connected in parallel across the first and second diodes. The second capacitor is connected in parallel across the second diode and the first diode of an adjoining multiplier stage. A first and a second transformer are interconnected to provide input to the multiplier. The primary windings of the two transformers are connected in parallel, the secondary windings of the two transformers are connected at a grounded juncture which is connected to the diode line. The first transformer drives the first AC line and the second transformer drives the second AC line. Desired output voltages are tapped through rectifiers from the diode line. The multiplier supplies DC voltages to a capacitive load without becoming loaded down.

In accordance with another aspect of the invention, a voltage multiplier includes a plurality of parallel connected multiplier stages. Each stage includes a first and a second AC line. A diode line is interposed between the first and the second AC line and includes a first and a second diode connected in series with the cathode of the first diode connected to the anode of the second diode. A first capacitor is connected from the first AC line to the junction between the first and second series diodes. A second capacitor is connected from the second AC line to the cathode of the second diode. The stages are interconnected such that the anode of a first diode of a stage is connected to the cathode of the second diode of the preceding stage. The input to the voltage multiplier includes a first and a second transformer having their respective primary windings connected in parallel and having their secondary windings interconnected to the diode line. The first transformer drives the first AC line and the second transformer drives the second AC line. The multiplied output voltage is tapped through a rectifier from the diode line to a capacitive load.

DESCRIPTION OF THE DRAWINGS

For a more complete understanding of the present invention and advantages thereof, reference is now made to the following description, taken in conjunction with the accompanying drawings, in which:

FIG. 1 is a schematic diagram of the voltage multiplier showing the preferred embodiment of the present invention;

FIG. 2 is a schematic diagram of a second embodiment of the present invention;

FIG. 3 is a schematic diagram of a third embodiment of the present invention; and FIG. 4 is a diagram of another embodiment of the transformer of the invention.

DESCRIPTION OF THE PREFERRED EMBODIMENT

FIG. 1 illustrates the preferred embodiment of the present transformer multiplier circuit which is generally referred to by the numeral 10 and which has a dual transformer input. A low AC voltage is supplied from source 12 to transformers 14 and 16. The primary winding 18 of transformer 14 is connected in parallel to the primary winding 20 of transformer 16. The secondary winding 22 of transformer 14 is connected at a common point 24 to the secondary winding 26 of transformer 16. The common point 24 serves as a center tap which is connected to circuit ground. The secondary winding 22 is connected to a first AC line 28 comprised of series connected capacitors 29, 30, 32, 34, etc.

The secondary winding 26 of transformer 16 is connected in series with a second AC line 36, which is composed of series connected capacitors 38, 40, 42, etc. It will of course be understood that, instead of a dual transformer input, a single transformer can be used wherein the transformer has split primary and secondary windings.

The grounded common point 24 is also connected to the diode line 45 which is composed of series connected diodes 46, 48, 50, 52, 54, 56, etc. The diodes in line 45 are connected in a cathode-to-anode configuration, although an anode-to-cathode connection configuration can also be utilized.

The AC line 28, AC line 36 and the diode line 45 are interconnected to form a plurality of identical multiplier stages. A typical complete stage is formed by capacitor 40 in AC line 36 which is connected in parallel across diodes 50 and 52, along with capacitor 32 in AC line 28 which is connected in parallel across diodes 52 and 54. This connection is repeated along the multiplier to create a plurality of multiplier stages in which the basic stage configuration is shown in block 58. The number of multiplier stages used depends upon the desired voltage multiplication. Using the present circuit configuration, the diode line provides increasing levels of voltage, which is a DC voltage with an AC component imposed upon it equal to the input voltage. There are no isolated DC points along the multiplier. Multiplied voltages can therefore be tapped through a rectifier from the diode line or from the diode line and one of the AC lines. Multiplied voltages can also be tapped directly from the diode line where the capacitor values are relatively high.

To explain the operation of the multiplier circuit shown in FIG. 1, it will be assumed that the transformer input voltage is zero and that there is no charge on any of the capacitors. When the AC voltage source 12 is applied, the transformers are phased to produce a positive voltage at a point designated as 60 and a negative voltage at a point designated as 62, both voltages having a peak magnitude of E with respect to common point 24, thereby biasing diode 46 on. The current designated by path 64 will flow in the direction of the arrow through diode 46 to charge capacitor 29 to E volts. When the transformer voltage begins to decrease, the point designated as 66 becomes more positive due to the charge on capacitor 29 and the increased voltage at point 62. This causes diode 46 to be biased off, and diode 48 on, thus causing current to flow through path 68 to transfer charge to capacitor 38 in AC line 36.

As the input AC voltage increases for a second time to the positive value at point 60, the transformer voltage adds to the voltage at capacitor 38, thereby causing the voltage at a point 70 to rise. This rise turns diode 48 off and diode 50 on. At the same time, the voltage at point 66 is dropped toward zero. Current flows through path 72 to transfer the charge from capacitor 38 in AC line 36 to capacitor 30 in AC line 28, until the transformer voltage reaches a maximum. As soon as the voltage at point 66 reaches zero, diode 46 will be biased on, and current will flow along path 64 to again charge capacitor 29 to E volts.

As the AC input voltage again decreases, diodes 46 and 50 are biased off. Since the voltage at point 62 rises, point 66 and now point 73 will also rise due to the charge on capacitors 29 and 30. Diode 52 is then biased on, and current flows along the path 74 and charges capacitor 40. When the voltage at point 66 exceeds that at point 70, the diode 48 is turned on, and the current again flows along path 68 to replace the charge on capacitor 38 used to charge capacitor 30.

The third cycle and each succeeding cycle continues this action, until capacitors 29 and 38 are fully charged to E volts. The voltage at points 66, 70, 73, etc., vary by E volts each cycle. At steady state conditions, each succeeding stage provides an additional voltage increment to provide a series of multiplied voltages. However, there are no points along the multiplier which provide a source of isolated DC voltages.

One of the advantages of the present invention is that the output voltage taps can be located at a plurality of different points along the multiplier. An important aspect of the invention is a tapping technique to provide DC voltages, such that the load is never connected directly to a capacitor. Each tapping technique utilizes a diode connected between the load and a capacitor contained in the multiplier. For example, the anode of a diode 76 is connected to the junction between diodes 50 and 52 in the diode line 45 and to the junction between capacitors 30 and 32 to provide a DC output voltage at terminal 80. Also, additional diodes may be connected to the junction between any two diodes in the diode line 45 to provide additional tapped voltages.

A second technique to tap off from the multiplier circuit is further illustrated in FIG. 1, wherein diodes 82 and 84 are connected in series across capacitor 40 and across diodes 50 and 52 of the diode line 45. The DC tap terminal 86 is connected to the junction between diodes 82 and 84.

A third tapping technique is also illustrated in FIG. 1 wherein a diode 88 is added to diode line 45 in series between the two diodes which are in parallel across a capacitor contained in AC line 36. A DC output voltage is tapped from the junction of diode 88 and the second diode of a multiplier stage to a load designated as 90.

This load connected to the output voltage terminals of any one of the above three tapping techniques may be an image intensifier tube, in which case the load is capacitive. Since the load is always diode isolated, a capacitive load such as an image intensifier tube does not severely load down the circuit.

FIG. 2 illustrates a second embodiment of the multiplier circuit 10, with like numerals being used for like and corresponding components. In this embodiment, the capacitors are interconnected in parallel rather than in series. The basic multiplier stage of this second embodiment is illustrated by block 92. The diode line 45 is composed of series connected diodes as shown in FIG. 1 or the diodes can be connected in an anode-to-cathode configuration. Unlike the embodiment of FIG. 1, AC lines 28 and 36 do not include capacitors. Referring to the typical multiplier stage illustrated in block 92, diodes 94 and 96 are connected in series in the diode line 45. A capacitor 98 is connected from the junction point between diode 94 and diode 96 to the AC line 36. A capacitor 100 is connected from the cathode of diode 96 to the AC line 28 to complete a multiplier stage.

Although two transformers 14 and 16 are shown as providing the input to the multiplier of FIG. 2, alternatively a single transformer may be used having split primary windings and split secondary windings or a center-tapped secondary winding, such that the primary windings are connected in parallel and the secondary windings are connected to drive the plurality of multiplier stages in the manner previously described. An illustration of such a single transformer is shown in FIG. 4.

Several DC voltage tapping techniques are also illustrated in FIG. 2. For example, diode 110 is connected in series in the diode line 45, with the anode of diode 110 connected to the capacitor that is connected from the diode line 45 to the AC line 36. The DC tap is obtained from the junction between the diode 110 and the first diode of the multiplier stage to a load 90, which may comprise a capacitive load such as an image intensifier tube or the like. An alternative tapping means to a capacitive load is illustrated using diodes 112 and 114 connected in series, which are connected in parallel across the two diodes 50 and 52 contained in the diode line 45. The DC tap is from the junction point between diodes 112 and 114 to terminal 116. Operation of the multiplier circuit shown in FIG. 2 is similar to that previously described.

Referring to FIG. 3, a third embodiment of the present invention is shown wherein like numbers are used for like and corresponding parts. This multiplier is a hybrid circuit combining the circuits shown in FIGS. 1 and 2. The multiplier stage of this third embodiment is illustrated as block 118, in which the diodes 120 and 124 are contained in the diode line 45. A capacitor 126 is connected from the junction point between diodes 120 and 124 to the AC line 36. A capacitor 128 is contained in the AC line 28 and is connected in parallel across diodes 120 and 124.

Various DC voltage tapping points are also shown in FIG. 3, including the use of diode 110 connected in the diode line 45 as shown in FIG. 2 where the tap is from the junction point between diode 110 and the second diode of the multiplier stage to terminal 130. A second and a third DC voltage tap is shown which is similar to the taps described in FIGS. 1 and 2. The operation of the multiplier circuit as shown in FIG. 3 is similar to that as previously described.

It will thus be seen that the present invention provides an AC to DC transformer-multiplier which may be very compactly constructed and which operates with low power loss. The compact construction of the present invention is achieved by utilizing only two capacitor strings. The multiplier of the present invention provides the capability to tap off a plurality of multiplied voltages of different magnitudes which are required in circuits used to supply DC voltages to image intensifier tubes. Further, since the load is always diode isolated in the present invention, tapping from any diode point provides a DC voltage that is not loaded down by a capacitive load such as an image intensifier tube.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. A voltage multiplier comprising:
a first AC line;
a second AC line;
a diode line having a plurality of series connected diodes interposed between said first and second AC lines;
a plurality of capacitors interconnected to said lines to define a plurality of multiplier stages;
transformer input means connected to the input of said multiplier stages for receiving AC voltage for driving said plurality of multiplier stages; and
output voltage tapping means extending from one of said AC lines and from at least one point along said diode line and including a rectifier for providing an isolated multiplied DC output voltage.

2. A voltage multiplier comprising:
a first AC line;
a second AC line;
a diode line having a plurality of series connected diodes interposed between said first and second AC lines;
a plurality of capacitors interconnected to said lines to define a plurality of multiplier stages;
transformer input means connected to the input of said multiplier stages for receiving AC voltage for driving said plurality of multiplier stages; and
output voltage tapping means including first and second series connected rectifiers connected in parallel with any two of said plurality of series connected diodes in said diode line to provide a multiplied DC output voltage from the junction of said first and second series connected rectifiers.

3. A voltage multiplier comprising:
a first AC line;
a second AC line;
a diode line having a plurality of series connected diodes interposed between said first and second AC lines;
a plurality of capacitors interconnected to said lines to define a plurality of multiplier states;
transformer input means connected to the input of said multiplier stages for receiving AC voltage for driving said plurality of multiplier stages; and
output voltage tapping means including a rectifier connected in series in said diode line, such that said voltage tapping means extends from the junction between said rectifier and one of said plurality of series connected diodes.

4. The voltage multiplier of claim 1 wherein said transformer input means comprises:
first and second transformers having their respective primaries connected in parallel, the secondaries of said transformers being commonly connected to said diode line, wherein said first transformer drives said first AC line and said second transformer drives said second AC lines.

5. A voltage multiplier comprising:
a first AC line;
A second AC line;
a diode line having a plurality of series connected diodes interposed between said first and second AC lines;
a plurality of capacitors interconnected to said lines to define a plurality of multiplier stages;
a single transformer having split primary and center-tapped secondary windings, wherein the split primary windings are connected in parallel, the center tap of said split secondary windings being connected to said diode line, said transformer receiving AC voltage for driving said plurality of multiplier stages; and output voltage tapping means extending from at least one point along said diode line and including rectifying means for providing an isolated multiplied DC output voltage.

6. The voltage multiplier of claim 1 further comprising a capacitive load connected to said output voltage tapping means, wherein said load is not directly connected to one of said plurality of capacitors.

7. The voltage multiplier of claim 6 wherein said capacitive load comprises an image intensifier tube.

8. A voltage multiplier comprising:
a first AC capacitor string having a plurality of series connected capacitors;
a second AC capacitor string having a plurality of series connected capacitors;
a diode string having a plurality of series connected diodes;
the junctions between said diodes being connected between capacitors along alternate ones of said first and said second AC capacitor strings to form a plurality of multiplier stages;
transformer input means receiving AC voltage for driving the multiplier stages wherein AC voltage appears at all points along said multiplier; and
output voltage tapping means including first and second series connected rectifiers connected in parallel with any two of said plurality of series connected diodes in said diode string to provide a multiplied DC output voltage from the junction of said first and second series connected rectifiers.

9. The voltage multiplier of claim 8 wherein said input means comprises first and second transformers having their respective primaries connected in parallel, the secondaries of said transformers being commonly connected to said diode string, wherein said first transformer drives said first AC string and said second transformer drives said second AC string.

10. A voltage multiplier comprising:
a first AC capacitor string having a plurality of series connected capacitors;
a second AC capacitor string having a plurality of series connected capacitors;
a diode string having a plurality of series connected diodes;
the junction between said diodes being connected between capacitors along alternate ones of said first and said second AC capacitor strings to form a plurality of multiplier stages;
transformer input means including a single transformer having split primary and center-tapped secondary windings, the split primary windings being connected in parallel and the center tap of said split secondary windings being connected to said diode string, said transformer input means receiving AC voltage for driving the multiplier stages wherein AC voltage appears at all points along said multiplier; and
output voltage tapping means extending from at least one point along the multiplier for providing a multiplied output voltage.

11. The voltage multiplier of claim 8 further comprising a capacitive load connected to said output voltage tapping means, wherein said load is not directly connected to one of said plurality of capacitors.

12. The voltage multiplier of claim 11 wherein said capacitive load comprises an image intensifier tube.

13. A voltage multiplier comprising:
a plurality of series connected multiplier stages, wherein each stage includes:
a first AC line including a first capacitor;
a second AC line including a second capacitor;
a diode line interposed between said first and said second AC lines and including first and second series connected diodes, wherein the cathode of said first diode is connected to the anode of said second diode;
said first capacitor connected in parallel across said first and said second diodes;
said second capacitor connected in parallel across said second diode and the first diode of an adjoining multiplier stage;
transformer input means for receiving AC voltage for driving said plurality of multiplier stages; and
output voltage tapping means extending from at least one point along said diode line and from one of said AC lines and including a rectifier for providing multiplied DC output voltage.

14. The voltage multiplier of claim 13 wherein said output voltage tapping means further extends from said diode line and includes a rectifier for providing multiplied DC output voltage.

15. The voltage multiplier of claim 13 wherein said transformer input means comprises first and second transformers having their respective primaries connected in parallel, the secondaries of said transformers being commonly connected to said diode line, wherein said first transformer drives said first AC line and said second transformer drives said second AC line.

16. The voltage multiplier of claim 15 wherein said output voltage tapping means comprises:
a diode connected to the junction of said first and said second diodes and said second capacitor.

17. The voltage multiplier of claim 15 wherein said output voltage tapping means comprises:
a diode connected to the junction of said second diode and said first diode of an adjoining stage and said first capacitor.

18. The voltage multiplier of claim 15 wherein said output voltage tapping means further comprises:
a third diode connected in series between the junction of said first diode and said second diode such that said first capacitor is connected in parallel with said first, second and third diodes for providing multiplied DC voltage from the junction of said second and said third diode.

19. The voltage multiplier of claim 15 wherein said output voltage tapping means further comprises:
third and fourth series connected diodes, wherein the cathode of said third diode is connected to the anode of said fourth diode, and said third and fourth diodes are connected in parallel with said first capacitor and said first and said second series connected diodes to provide a multiplied DC output voltage from the junction between said third and fourth series connected diodes.

20. The voltage multiplier of claim 15 wherein said output voltage tapping means further comprises:
third and fourth series connected diodes, wherein the cathode of said third diode is connected to the anode of said fourth diode, and said third and fourth diodes are connected in parallel with said second capacitor and said second and said first diode of an adjoining stage to provide a multiplied DC output voltage from the junction between said third and fourth series connected diodes.

21. A voltage multiplier comprising:
a plurality of parallel connected multiplier stages, wherein each stage includes:
  a first AC line;
  a second AC line;
  a diode line interposed between said first and said second AC line and composed of two series connected diodes wherein the cathode of said first diode is connected to the anode of said second diode;
  a first capacitor connected from the junction point between said first and said second diodes to said first AC line; and
  a second capacitor connected between the cathode of said second diode and said second AC line;
transformer input means for receiving AC voltage for driving said plurality of multiplier stages; and
output voltage tapping means extending from at least one point along said diode line and from one of said AC lines and including a rectifier for providing multiplied DC output voltage.

22. The voltage multiplier of claim 21 wherein said transformer input means comprises:
first and second transformers having their respective primaries connected in parallel, the secondaries of said transformer being commonly connected to said diode line, wherein said first transformer drives said first AC line and said second transformer drives said second AC line.

23. The voltage multiplier of claim 21 wherein said transformer input means comprises a single transformer having split primary and center-tapped secondary windings, wherein the split primary windings are connected in parallel, the center tap of said split secondary windings being connected to said diode line.

24. The voltage multiplier of claim 22 wherein said output voltage tapping means further extends from said diode line and includes rectifying means for providing multiplied DC voltage.

25. The voltage multiplier of claim 21 wherein said output voltage tapping means comprises:
third and fourth series connected diodes, wherein the cathode of said third diode is connected to the anode of said fourth diode, and said third and fourth diodes are connected in parallel with said first and said second series connected diodes to provide a multiplied DC output voltage from the junction between said third and fourth series connected diodes.

26. The voltage multiplier of claim 21 wherein said output voltage tapping means comprises:
a third diode connected in series with said first and said second diodes between the junction of said first capacitor and said first diode for providing multiplied DC voltage from the junction of said third diode and said first diode.

27. A voltage multiplier comprising:
a plurality of multiplier stages including:
  a first AC line including a first capacitor;
  a second AC line;
  a diode line interposed between said first and said second AC line composed of first and second series connected diodes wherein the cathode of said first diode is connected to the anode of said second diode;
  a second capacitor connected from the junction point between said first and said second diodes to said second AC line;
  said first capacitor connected in parallel across said first and said second series connected diodes;
transformer input means for receiving AC voltage for driving said plurality of multiplier stages; and
output voltage tapping means from at least one point along said diode line and from one of said AC lines and including a rectifier for providing multiplied DC output voltage.

28. The voltage multiplier of claim 27 wherein said transformer input means comprises:
first and second transformers having their respective primaries connected in parallel, the secondaries of said transformers being commonly connected to said diode line, wherein said first transformer drives said first AC line and said second transformer drives said second AC line.

29. The voltage multiplier of claim 27 wherein said transformer input means comprises a single transformer having split primary and center-tapped secondary windings, wherein the split primary windings are connected in parallel, the center tap of said split secondary windings being connected to said diode line.

30. The voltage multiplier of claim 27 wherein said output voltage tapping means further extends from said diode line and includes a rectifier for providing multiplied DC voltages.

31. The voltage multiplier of claim 27 wherein said output voltage tapping means comprises:
third and fourth series connected diodes, wherein the cathode of said third diode is connected to the anode of said fourth diode, and said third and fourth diodes are connected in parallel with said first and said second series connected diodes to provide a multiplied DC output voltage from the junction between said third and fourth series connected diodes.

32. The voltage multiplier of claim 27 wherein said output voltage tapping means comprises:
third and fourth series connected diodes, wherein the cathode of said third diode is connected to the anode of said fourth diode, and said third and fourth diodes are connected in parallel with said first capacitor and said first and said second series connected diodes to provide a multiplied DC output voltage from the junction between said third and fourth series connected diodes.

33. The voltage multiplier of claim 27 wherein said output voltage tapping means comprises:
a third diode connected in series with said first and said second diodes between the junction of said first capacitor and said first diode for providing multiplied DC voltage from the junction of said third diode and said first diode.

* * * * *

UNITED STATES PATENT AND TRADEMARK OFFICE
CERTIFICATE OF CORRECTION

PATENT NO. : 4,050,005
DATED : September 20, 1977
INVENTOR(S) : Brian K. Maginness It is certified that error appears in the above-identified patent and that said Letters Patent are hereby corrected as shown below:

Column 7, line 47, change "junction" to --junctions--
Column 9, line 38, change "Claim 22" to --Claim 21--

Signed and Sealed this

Twentieth Day of June 1978

[SEAL]

Attest:

RUTH C. MASON
Attesting Officer

DONALD W. BANNER
Commissioner of Patents and Trademarks